(12) United States Patent
Haraway et al.

(10) Patent No.: US 9,694,995 B2
(45) Date of Patent: Jul. 4, 2017

(54) DUSTLESS SPOUT ASSEMBLY

(71) Applicant: Coy N. Haraway, Cordova, TN (US)

(72) Inventors: Coy N. Haraway, Cordova, TN (US);
Bo James Ruzicka, La Porte City, IA (US)

(73) Assignee: Coy N. Haraway, Cordova, TN (US)

( * ) Notice: Subject to any disclaimer, the term of this patent is extended or adjusted under 35 U.S.C. 154(b) by 0 days.

(21) Appl. No.: 15/254,024

(22) Filed: Sep. 1, 2016

(65) Prior Publication Data

US 2016/0368721 A1 Dec. 22, 2016

Related U.S. Application Data

(63) Continuation-in-part of application No. 14/248,381, filed on Apr. 9, 2014, now Pat. No. 9,434,544.

(60) Provisional application No. 61/811,339, filed on Apr. 12, 2013.

(51) Int. Cl.
*B65G 11/20* (2006.01)
*B65G 69/18* (2006.01)

(52) U.S. Cl.
CPC .......... *B65G 69/188* (2013.01); *B65G 11/206* (2013.01); *B65G 2201/042* (2013.01)

(58) Field of Classification Search
CPC ..... B65G 11/20; B65G 11/203; B65G 11/206; B65G 11/146
USPC ...................................... 198/534; 193/30, 32
See application file for complete search history.

(56) References Cited

U.S. PATENT DOCUMENTS

| | | | |
|---|---|---|---|
| 1,024,297 A | 4/1912 | Thompson | |
| 1,231,778 A | 7/1917 | Nall | |
| 1,668,218 A | 5/1928 | Sherban | |
| 1,820,297 A | 8/1931 | Butler | |
| 2,035,329 A | 3/1936 | McPhail | |
| 2,071,846 A * | 2/1937 | Lamb | B01F 5/205 |
| | | | 118/303 |
| 2,094,707 A | 10/1937 | Jones | |
| 2,120,506 A | 6/1938 | O'Rourke | |
| 2,217,710 A | 10/1940 | Shaler | |
| 2,294,290 A | 8/1942 | Freeman | |
| 2,611,876 A | 9/1952 | Hartman | |

(Continued)

FOREIGN PATENT DOCUMENTS

FR 69669 E 11/1958

*Primary Examiner* — Mark A Deuble
(74) *Attorney, Agent, or Firm* — Wood Herron & Evans LLP

(57) ABSTRACT

A spout assembly and related method of regulating the flow of particulate material. The spout assembly includes a chute, at least first and second plates, and a counterbalance mechanism. The first and second plates are positioned downstream from the chute, the lower ends of the first and second plates defining an opening with an area that is smaller than a cross-sectional area of the chute so that the material may accumulate prior to passing through the opening. The counterbalance mechanism produces a biasing force on the first and second plates toward the centerline to adjust the area of the opening, and permits the first and second plates to move outwardly away from the centerline in response to the weight of the accumulated material. The counterbalance mechanism includes at least a first separately adjustable counterbalance coupled to the first plate and a second separately adjustable counterbalance coupled to a second plate.

18 Claims, 12 Drawing Sheets

(56) References Cited

U.S. PATENT DOCUMENTS

| | | | |
|---|---|---|---|
| 2,617,531 A | 11/1952 | Palmer | |
| 2,634,842 A | 4/1953 | Caylor | |
| 2,676,668 A | 4/1954 | Lindsay | |
| 2,761,186 A | 9/1956 | Peterson | |
| 2,791,355 A | 5/1957 | Morgan, Jr. | |
| 2,913,145 A | 11/1959 | Hopkins et al. | |
| 2,968,400 A | 1/1961 | Clute | |
| 2,973,740 A * | 3/1961 | Hopkins | B65G 69/20 118/303 |
| 2,976,676 A | 3/1961 | Kress | |
| 3,005,547 A | 10/1961 | Freeman | |
| 3,081,009 A | 3/1963 | Cooper | |
| 3,167,089 A | 1/1965 | Gordon | |
| 3,223,215 A | 12/1965 | Budjinski et al. | |
| 3,254,869 A | 6/1966 | Easey | |
| 3,365,240 A | 1/1968 | Gordon | |
| 3,485,420 A | 12/1969 | Lucas | |
| 3,491,923 A | 1/1970 | Osipov | |
| 3,794,386 A | 2/1974 | Hite | |
| 3,923,210 A | 12/1975 | Jackson | |
| 4,203,535 A | 5/1980 | Burnett et al. | |
| 4,255,033 A | 3/1981 | Rose | |
| 4,342,383 A | 8/1982 | Burnett | |
| 4,410,076 A | 10/1983 | West et al. | |
| 4,552,573 A | 11/1985 | Weis et al. | |
| 4,610,218 A * | 9/1986 | Johnson | B01J 8/085 118/303 |
| 5,016,686 A | 5/1991 | Gerstenkorn | |
| 5,154,271 A | 10/1992 | Binzen | |
| 6,085,987 A | 7/2000 | Haraway | |
| 7,364,034 B1 | 4/2008 | Clark et al. | |
| 7,770,713 B2 | 8/2010 | Nakagawa et al. | |
| 9,434,544 B1 * | 9/2016 | Ruzicka | B65G 11/206 |
| 2012/0090956 A1 | 4/2012 | Brobst | |

\* cited by examiner

DUSTLESS SPOUT ASSEMBLY

DUSTLESS SPOUT ASSEMBLY

This application is a continuation-in-part of application Ser. No. 14/248,381, filed Apr. 9, 2014 which claims the priority of U.S. Provisional Patent Application Ser. No. 61/811,339, filed Apr. 12, 2013, the disclosures of which are hereby incorporated by reference herein.

BACKGROUND OF THE INVENTION

Grain and other particulate material falling uncontrolled at high velocities causes: (1) damage to the grain and other particulate material and (2) creates dust. The damage occurs both during fall in a downwardly inclined conduit, as well as upon impact after discharge from the conduit. The damage is apparently caused by particle-to-conduit abrasion and particle-to-particle impact, and these interactions cause fines and dust.

The velocity increase of the material is most rapid in a vertical conduit, but even in a slanting conduit, velocities of several hundred feet per minute are attained in a few feet. A free-falling stream of such material tends to reach a terminal velocity because the air currents within and around the stream cause turbulence when the stream is unconfined. Upon discharge, grain or other particulate material flowing in conduits can reach velocities well above such terminal velocities. In a long conduit, the velocity of the stream can exceed even two thousand feet per minute. It is believed that the damaging velocity is not highly dependent on the angulation of the conduit. As such, the damaging velocity is roughly the same for a given stream whether it is falling in a vertical conduit or an angled conduit.

For a given type of grain or other particulate material, a velocity of 1600 feet per minute is the approximate damaging velocity in many cases. Damage to the material and creation of dust as the result of high conduit velocities also occurs with materials other than grain, although it is most important in respect to grain because of the relative frangibility and layered structure of grain kernels.

To prevent a falling particulate stream of material from exceeding damaging velocity and generating excessive dust, one straightforward approach is to limit the distance of the drop or to angulate the conduit so that the velocity increase is diminished. However, it is difficult to avoid a substantial elevation change in many instances, as for example in loading grain or other particulate material into the hold of a ship.

A flow restriction in the path of the falling material may slow the material velocity. This is often achieved by devices called "dead boxes" which have a narrow fixed throat section mounted directly in the conduit. However, dead boxes are effective primarily in those situations where the grain or other particulate material flow rate (i.e., bushels per hour) is constant or within a relatively narrow range so as to avoid "surges." However, constant velocity is not usually the case. In the typical situation, surges, abrupt changes in flow rate, occur repeatedly. Surging occurs, for example, when a conveyor bucket empties into the upper end of the chute and a period of lower flow may follow, until another bucket refills the chute. Non-uniform moisture content in the grain or other particulate material is another cause of surges.

When the flow rate is uneven, the use of a fixed restriction such as a dead box to retard flow is of little effect. In periods of low flow rate, the small stream passes almost unrestrained through the throat opening, but at periods of heavy flow, a "head" of grain or other particulate material builds up rapidly above the throat. This can cause bridging or clogging which can choke off flow completely.

In addition to the problem of damage to the grain or particulate material due to high falling velocities, air entrained within the falling stream is a significant problem due to the creation of dust. Ambient dust as a result of a falling stream of particulate material typically requires workers to wear masks or other protective gear. Furthermore, the work environment is clouded by the dust and workers have difficulty seeing for secure footing and evaluation of the level of fill of the vessel receiving the grain or particulate material.

Known methods and apparatus attempting to reduce the dust and fall velocity of grain or other particulate material in vertical conduits by which the velocity can be prevented from exceeding the damaging value even under widely varying flow rates are disclosed in U.S. Pat. Nos. 6,085,987 and 4,342,383, each of which is hereby incorporated by reference in its entirety.

The devices in each of these cited patents include an array of downwardly and inwardly sloping blades supported by the body of an accumulator. The blades have lower ends which define an opening between them, the opening having an area that at its maximum is substantially smaller than the area of the conduit. The overlapping blades are angled inwardly so that they deflect the grain particles centrally as they fall. The inward deflection of the particles toward the smaller area of the throat causes a mass of grain or other particulate material particles to accumulate above the blades and over the opening in an accumulation chamber within the conduit.

Variable biasing means act on the blades to urge them inwardly and the biasing means is responsive to the weight of the accumulated mass of the particles to provide a larger opening as the weight increases, thereby releasing particles more rapidly from the accumulation space above the blades and reducing the area of the opening as the weight of particles decreases.

However, the adjustability of the biasing mechanism disclosed in these patents in some instances is inadequate. In an accumulator or regulating device, it is important to keep the biasing force of the blades on the grain or other particulate material flow without applying excessive force to cause the grain or other particulate material to back-up and the accumulation mass above the gate or opening of the blades to grow too large and become clogged or jammed.

Another way to minimize dust is to apply mineral oil to the particulate material. Conventionally, the grain is unloaded from the truck or rail car into a pit that has a conveyor at the bottom where the grain hits. The conveyor runs between the pit and the storage area, and mineral oil is applied to the grain as the grain travels on the conveyor. As the conveyor moves, the grain is turning over and over and the mineral oil coats the grain, resulting in the dust attaching to the grain. However, a large quantity of mineral oil must be applied to sufficiently limit the dust, and often the mineral oil absorbs into the grain, dimensioning the mineral oil's effectiveness in controlling dust. It is desired to have a spout that is designed to control this dust created during the load out process. Load out dust is generally the dust created from the movement of particulate material from storage (such as in a silo) to the truck or rail car.

As such, there is a need for an improved system for regulating the flow of grain or other particulate material that overcomes these and other problems in the art, particularly the excessive generation of dust and damage to the falling grain or other material without creating a blockage of accumulated grain.

SUMMARY OF THE INVENTION

These and other objectives of this invention have been attained by a spout to control grain or other particulate material falling through and being discharged from a conduit. In one embodiment of this invention, an array of plates is mounted at the discharge end of a chute to control the flow of the particulate material there from. A counterbalance mechanism is coupled to each of the plates and can be precisely adjusted to provide the appropriate counterbalancing force on the plates to control the particulate material flow without damage to the particulate material and to minimize the dust generated in the flow of the material. A divider is mounted in the stream of material flowing to the array of plates to reduce the dust escaping the flowing material. The divider splits the flow of particulate material into at least two split streams and a void region is created below the divider to control the dust.

As the grain flows through the chute section and around the divider, it enters a funnel as the split streams are merged together. As the grain exits the funnel, it enters a spout and engages the plates. As the weight of the grain impinges upon the plates, the plates are urged outwardly against the bias of the counterbalance mechanism to increase the open area for the grain to flow through the spout. As the flow of grain decreases, the weight of the grain on the plates likewise decreases and the bias of the counterbalance mechanism springs urges the plates inwardly, thereby directing and focusing the flow of the grain through the assembly. Advantageously, the void region proximate the divider entraps the dust, collects it and circulates it back into the split streams of grain, thereby minimizing the escape of the dust during the transfer process of the grain through the assembly.

According to another exemplary embodiment, an apparatus for regulating the flow of particulate material includes a chute, at least first and second plates, and a counterbalance mechanism. The chute is adapted to receive the flow of particulate material. The first and second plates are positioned downstream from the chute. Each of the first and second plates has a lower end and is coupled to the chute. Additionally, each of the first and second plates project toward a centerline axis of the conduit, with the lower ends of the first and second plates defining an opening with an area that is smaller than a cross-sectional area of the chute, so that the material may accumulate prior to passing through the opening. The counterbalance mechanism produces a biasing force on the first and second plates toward the centerline to adjust the area of the opening. The counterbalance mechanism permits the first and second plates to move outwardly away from the centerline in response to the weight of the accumulated material. The counterbalance mechanism includes a first separately adjustable counterbalance coupled to the first plate and a second separately adjustable counterbalance coupled to a second plate.

According to another aspect of the present invention, a method of regulating the flow of a stream of particulate material which is falling in a downwardly oriented conduit is disclosed. The method includes interposing at least first and second plates having a lower end in the path of the stream in the conduit. The first and second plates slow the movement of the particulate material and deflect the particulate material toward a longitudinal axis of the conduit. The method also includes providing a central opening adjacent the lower end of the first and second plates. The method also includes yieldably biasing the first and second plates inwardly in a direction tending to reduce the size of the opening with a biasing force delivered by a counterbalance mechanism. The first and second plates restrict the fall of the material and slow the movement through the central opening. The method also includes adjusting the biasing force delivered to the first plate using at least a first separately adjustable counterbalance. The method also includes adjusting the biasing force delivered to the second plate using at least a second separately adjustable counterbalance. The method also includes continuously discharging particles through the opening while varying the size of the opening adjacent the plates as the weight of the mass of particulate material above the opening changes with flow rate variations of the material, the size of the opening increasing as the weight of the mass increases in response to an increase in the flow rate of the material.

BRIEF DESCRIPTION OF THE DRAWINGS

The features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
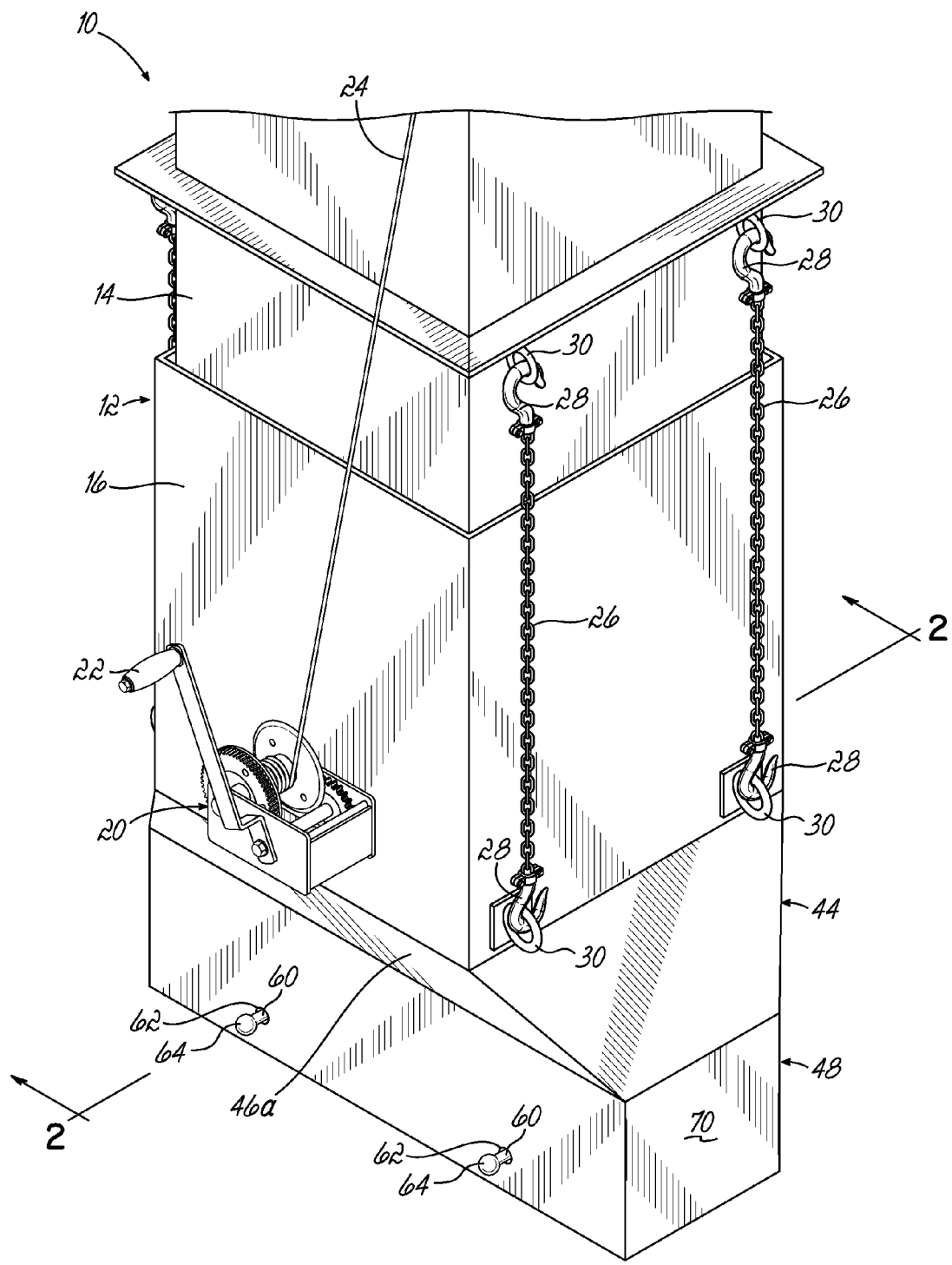
FIG. 1 is a perspective view of one embodiment of a spout assembly according to this invention.
Figure 2:
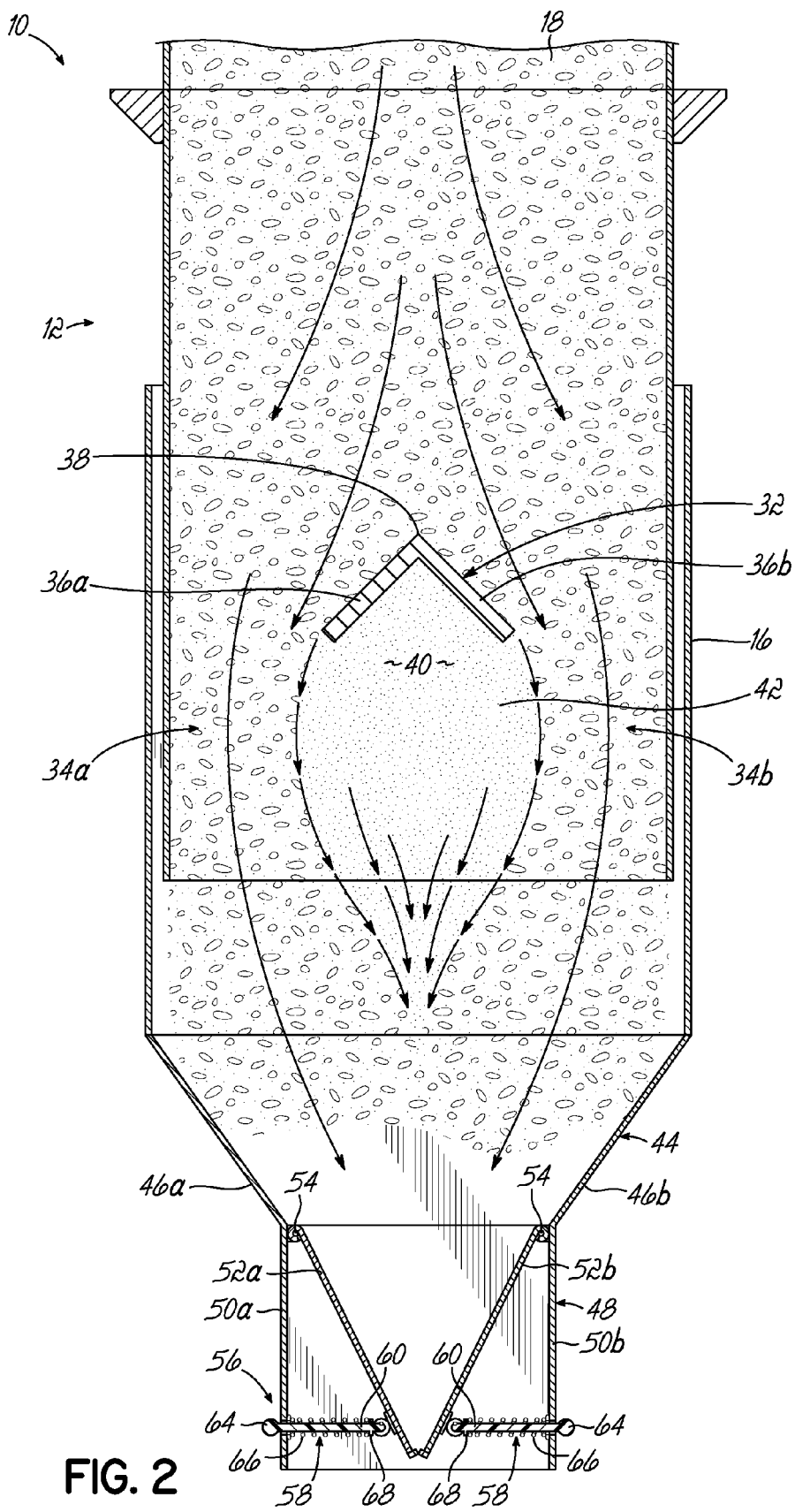
FIG. 2 is a cross-sectional view of the spout assembly of FIG. 1 with grain flowing through it.

Referring to FIG. 1, a perspective view of one embodiment of a dustless spout assembly 10 according to this invention is shown. Cross-sectional views of the spout assembly 10 are likewise shown in FIGS. 2-3B. The assembly 10 includes an upper chute section 12 formed by an upper and a lower chute 14, 16 telescopically mated together. While two chutes are shown and described, this invention is not limited to two chutes and only one chute or more than two chutes can be used. The upper chute 14 is received within the lower chute 16 as shown in FIG. 2. In one embodiment, the outer perimeter dimension of the lower chute 16 is 23 inches by 23 inches and the similar dimensions of the upper chute 14 are likewise designed to matingly fit within the lower chute 16. In operation, the spout assembly 10 is adapted for the transfer of grain, corn or other particulate material 18 in a generally vertical downward direction from a supply of grain 18 into a rail car, cargo hold or other receptacle at the downstream exit end of the assembly 10.

The length of the chute section 12 of the assembly 10 is adjustable to accommodate different delivery environments for the grain 18. In the embodiment shown in FIGS. 1-3B, the relative positions of the upper and lower chutes 14, 16 are telescopically adjustable and this may be accomplished in any one of a variety of manners including a winch 20 mounted to an outer surface of the lower chute 16 as shown in FIG. 1. The winch 20 includes a hand crank 22 for manually adjusting a length of a cable 24 attached to the winch 20 on the lower chute 16. An upper end (not shown) of the cable 24 is attached to the upper chute 14 or another fixed surface positioned above the lower chute 16. Operation of the winch 20 adjusts the length of the cable 24 and thereby the position of the lower chute 16 relative to the upper chute 14 and a vertical height of the chute section 12. Alternatively, the chute 16 may be moved vertically up and down depending on the size of the rail car and the means for movement of the chute 16 may be a hydraulic or other appropriate system. Chains 26 with hooks 28 on opposite ends of each chain engage through rings 30 mounted on the outer surface of the chutes 14, 16 as shown in FIGS. 1 and 2, may be utilized to secure the position of the chutes 14, 16 relative to each other once adjusted to a desired length.

As shown particularly in FIG. 2, a divider 32 is positioned centrally within the assembly 10 and in one embodiment in the upper chute 14 to extend longitudinally between opposite sections of the chute 14. The divider 32 is fixedly mounted within the assembly 10 within the travel path of the grain 18 flowing through the chute section 12 so as to divide the flow of grain 18 into first and second split streams 34a, 34b of grain on opposite sides of the divider 32. In one embodiment, the divider 32 may be an angle iron having a pair of generally perpendicularly oriented legs 36a, 36b with the juncture 38 between the legs oriented medially within the chute section 12 and directed upwardly to thereby divide the flow of grain 18 into the split streams 34a, 34b. The construction and material of the divider 32 may be modified with the respective legs 36 being longer for heavier material flowing through the assembly 10 as is required for a particular application. Moreover, in alternative embodiments of this invention, the position of the divider 32 within the assembly 10 may be adjustable vertically depending upon the desired flow characteristics of the material 18 within the assembly 10. The divider 32 may be of a different design to shift the stream 34 into more than two split streams within this invention.

One advantage that the divider 32 according to various embodiments of this invention is that a region 40 immediately below the divider 32 and generally between the spaced split streams 34a, 34b of material 18 is a void region with little or no grain within the void region 40. Due to the flow characteristics of the particulate material 18 and the divider 32 splitting the flow of material into the split streams 34a, 34b, a significant portion of the dust 42 generated from the flow of the material 18 is entrapped within the void region 40 immediately below the divider 32. As such, the generation of the dust 42 which would normally result from the flow of material 18 is minimized and reduced as it is trapped and concentrated within the void region 40 below the divider 32.

After the split streams 34a, 34b flow past the divider 32 and downstream from the void region 40, they merge back together in a funnel 44 mounted beneath the chute section 12. The funnel 44 includes a pair of opposed tapered sidewalls 46a, 46b which are aligned longitudinally across the assembly 10 and generally parallel with the orientation of the legs 36a, 36b and the longitudinal axis of the divider 32. At the downstream end, narrow portion of the funnel 44, a spout 48 is mounted to the assembly 10. The spout 48 has a pair of spaced, generally parallel outer walls 50a, 50b, each of which extends downwardly from one of the sidewalls 46a, 46b of the funnel 44. A pair of opposed and moveable plates 52a, 52b is mounted within the spout 44 to deflect and guide the grain 18 flowing from the funnel 44 into the spout 48 as shown generally in FIGS. 2-3B. Each plate 52 is an elongate planar member which is mounted by a hinge 54 along its upper edge at the juncture between the spout 48 and the funnel 44. A longitudinal axis of the divider 32 may be parallel to the longitudinal axes of the plates 52a, 52b. A flange 55 is formed or mounted at the distal end of each plate and orientated perpendicularly to the plane of the associated plate 52. In one embodiment, the flange 55 is ¼" key stock. The flanges 55 catch or divert some of the material 18 and assist in movement of the plates 52.

Figure 3A:
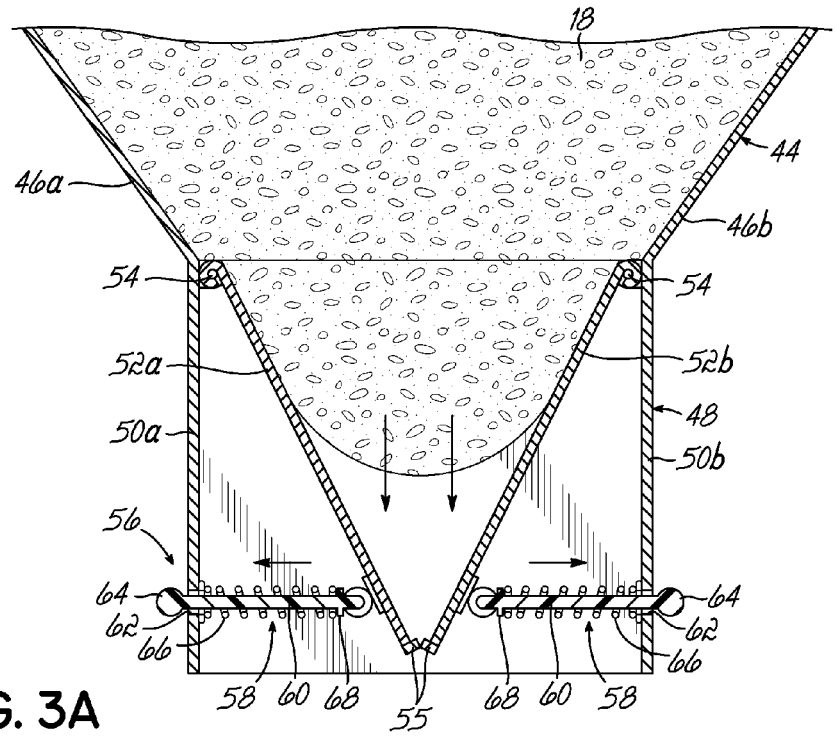
FIGS. 3A-3B are sequential cross-sectional views of grain flowing through a spout of the assembly of FIGS. 1 and 2.
Figure 3B:
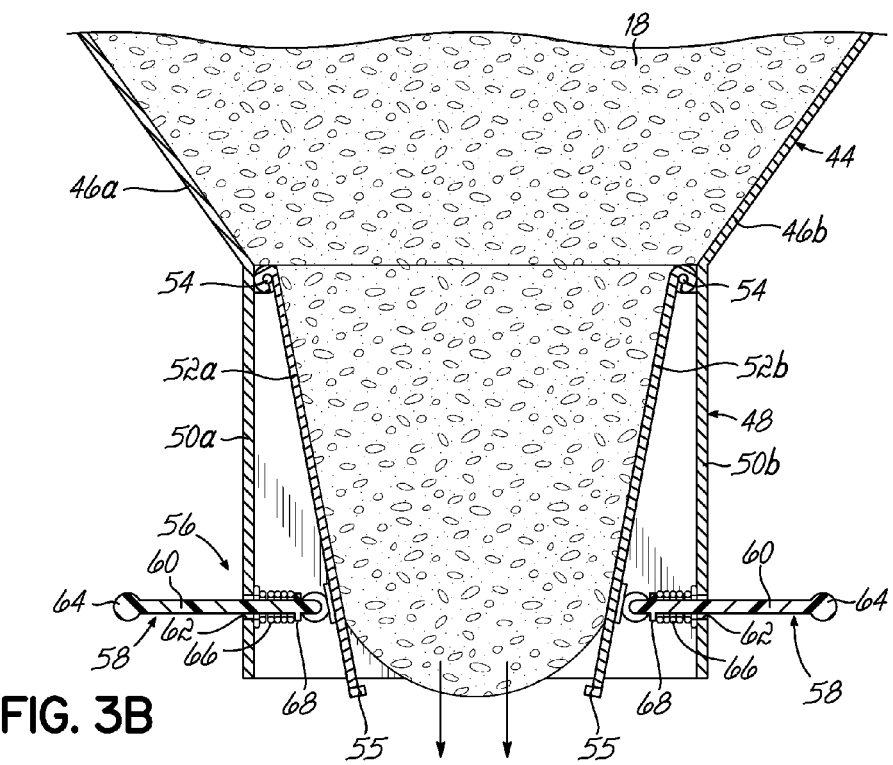
Figure 4:
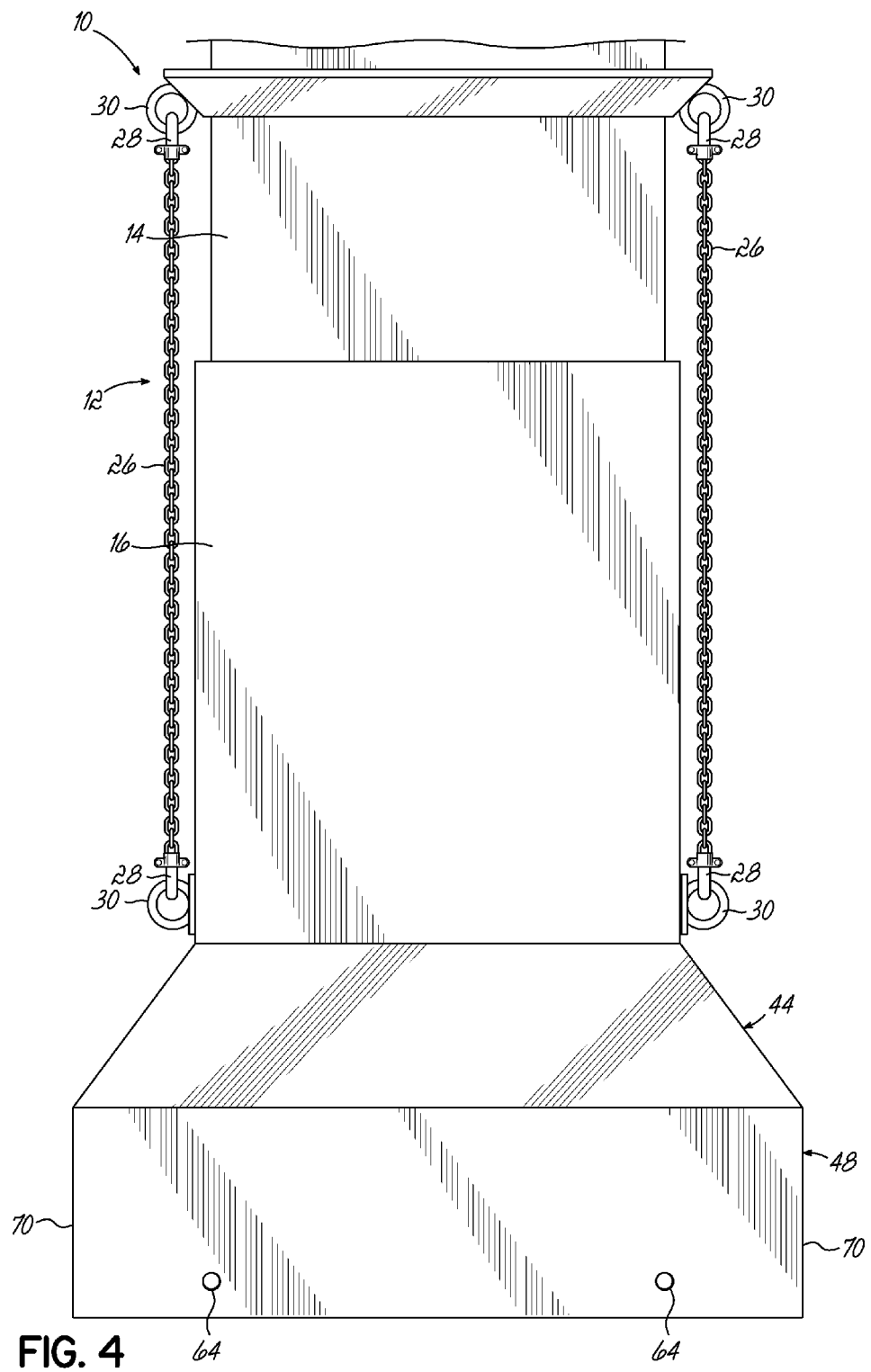
FIG. 4 is a side elevational view of the spout assembly of FIGS. 1-3B.

A counterbalance mechanism 56 in the form of one or more compression spring and rod assemblies 58 is mounted adjacent the lower end of each plate 52. In one embodiment as shown in FIGS. 2-3B, the counterbalance mechanism 56 includes one or more rod and compression spring assemblies 58 with a rod 60 pivotally attached to an outer surface of the plate 52 and extending laterally outwardly through a hole 62 in the outer wall 50 of the spout 48. A knob 64 is formed on the terminal end of the rod 60 on the exterior of the spout 48 as shown in FIGS. 1-3. A compression spring 66 is mounted between an abutment in the form of a nut 68 threaded on the rod 6o and the inner face of the outer wall 50 of the spout 48. The compression spring 66 biases the plate 52 toward the center line of the assembly 10 and the opposite plate and into the path of the grain 18 flowing downwardly from the funnel 44 and into and through the spout 48.

In one embodiment, the counterbalance mechanism 56 includes a pair of opposed plates sea, 52b with two threaded rod and spring assemblies 58 coupled to each plate 52. One of ordinary skill in the art would appreciate that the biasing force delivered onto each plate 52 may be adjusted depending upon the strength or spring constant of the spring 66 and the number of springs 66 engaging the plate 52. In one embodiment of this invention, two 25 pound springs 66 are mounted to each plate 52 producing a 50 pound biasing force on the plate 52 such that over 50 pounds of grain 18 is needed to deflect the plate 52 outwardly and enlarge the open area in the spout 48 for the grain 18 to flow through and over the plate 52. With the two plates sea, 52b arrangement shown in FIGS. 1-3 and four 25 pound springs 66 mounted to the plates 52, a total of more than 100 pounds of grain 18 is needed to deflect both of the plates sea, 52b outwardly as shown in FIG. 3B. As a result, the spout assembly 10 of this invention avoids the clogging of excessive accumulation of material 18 even during surges while minimizing the discharge of dust and fines into the work environment.

As the grain 18 flows through the chute section 12 and around the divider 32, it enters the funnel 44 as the split streams 34a, 34b are merged together. As the grain 18 exits the funnel 44, it enters the spout 48 and engages the plates sea, 52b. As the weight of the grain 18 impinges upon the plates 52, the plates 52 are urged outwardly against the bias of the counterbalance mechanism 56 to increase the open area for the grain 18 to flow through the spout 48 as shown in FIG. 3B. As the flow of grain 18 decreases, the weight of the grain 18 on the plates 52 likewise decreases and the bias of the counterbalance mechanism springs 66 urges the plates 52 inwardly, thereby directing and focusing the flow of the grain 18 through the assembly 10. Advantageously, the void region 40 entraps the dust 42, collects it, and circulates it back into the split streams 34a, 34b of grain, thereby minimizing the escape of the dust during the transfer process of the grain through the assembly 10. The opposing ends of the funnel 44 and spout 48 may be capped with opposing end plates 70 as shown in FIG. 1.

Figure 5:
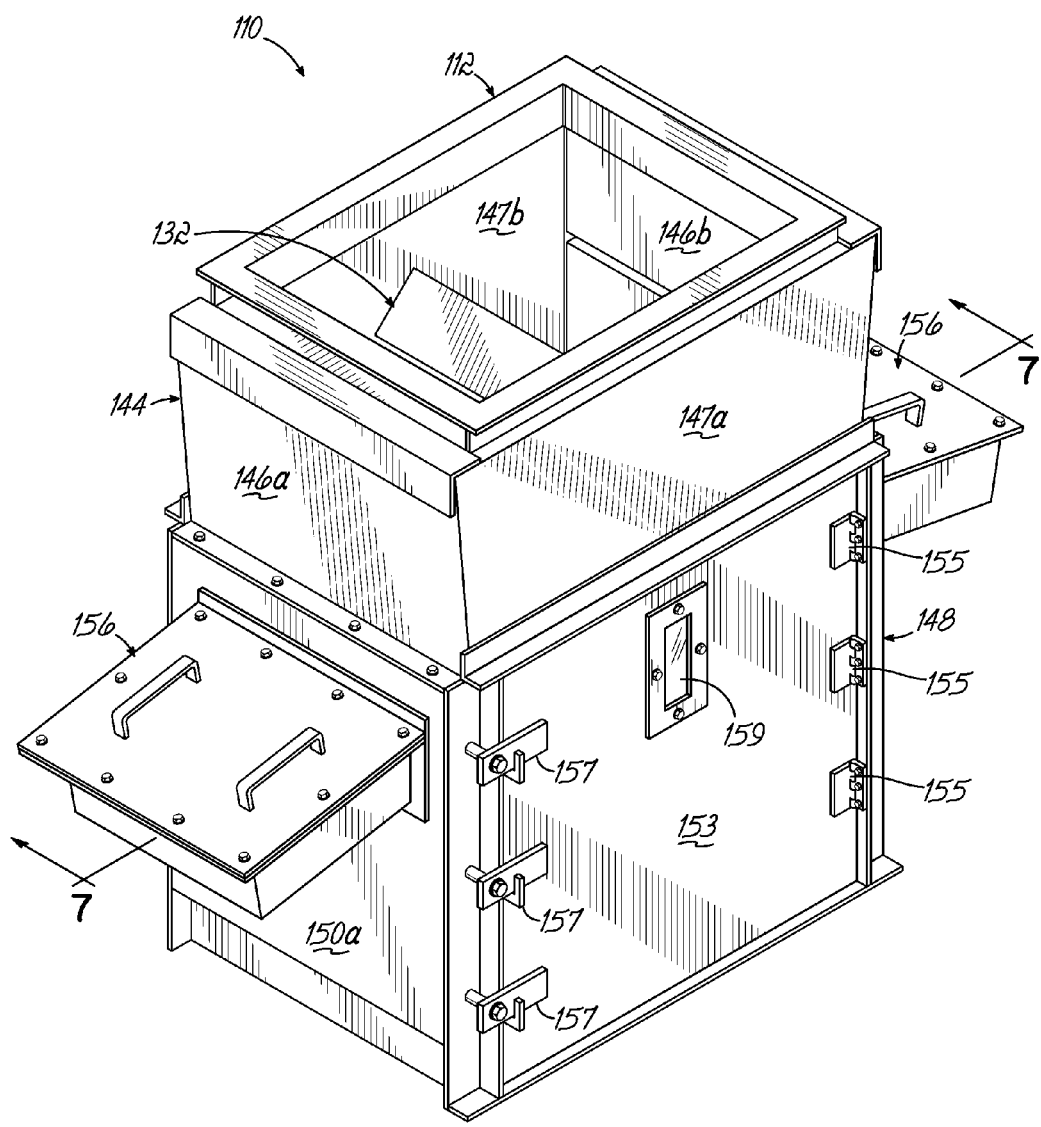
FIG. 5 is a perspective view of an alternative embodiment of this invention.
Figure 6:
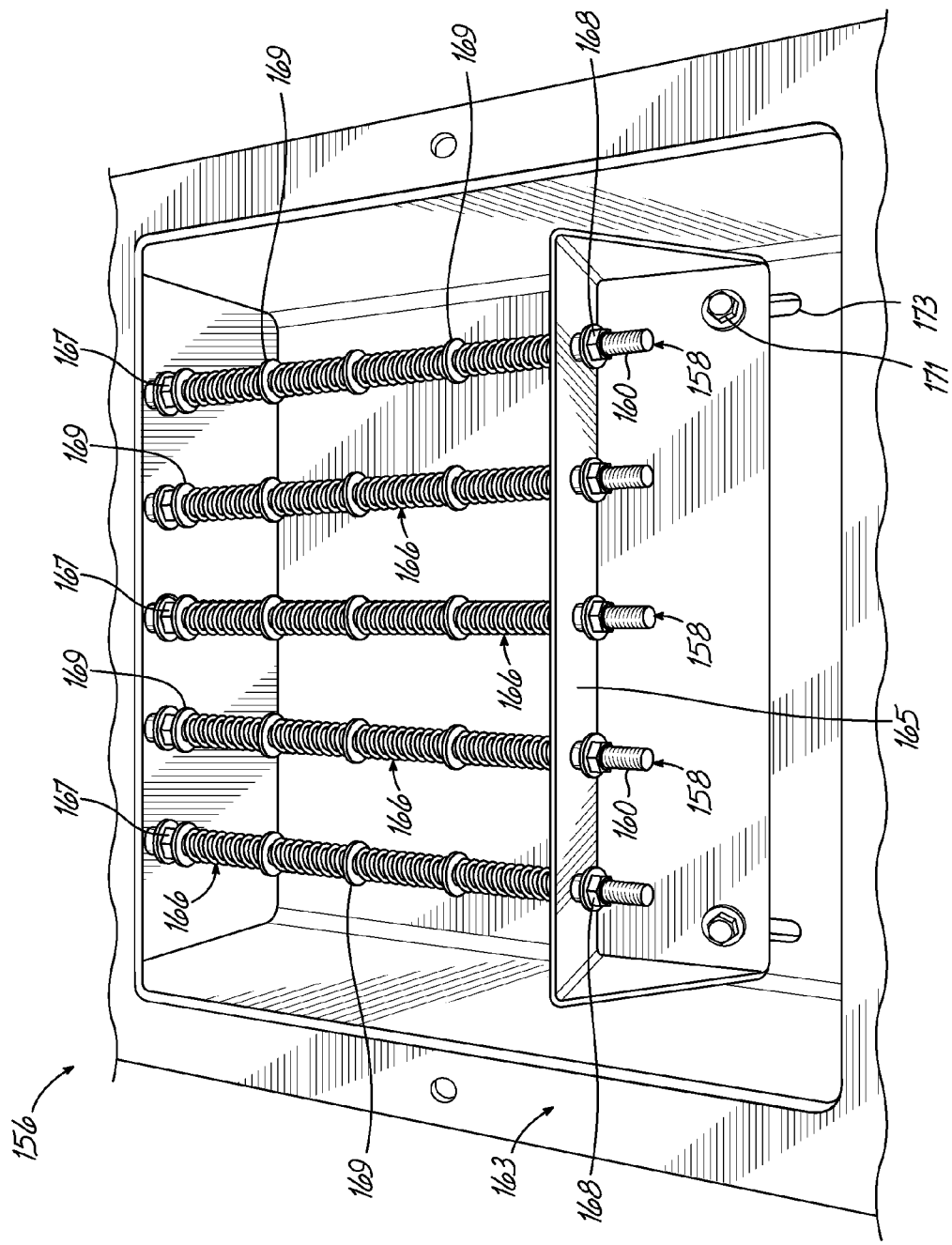
FIG. 6 is a view of a counterbalance mechanism of the embodiment of FIG. 5.
Figure 7:
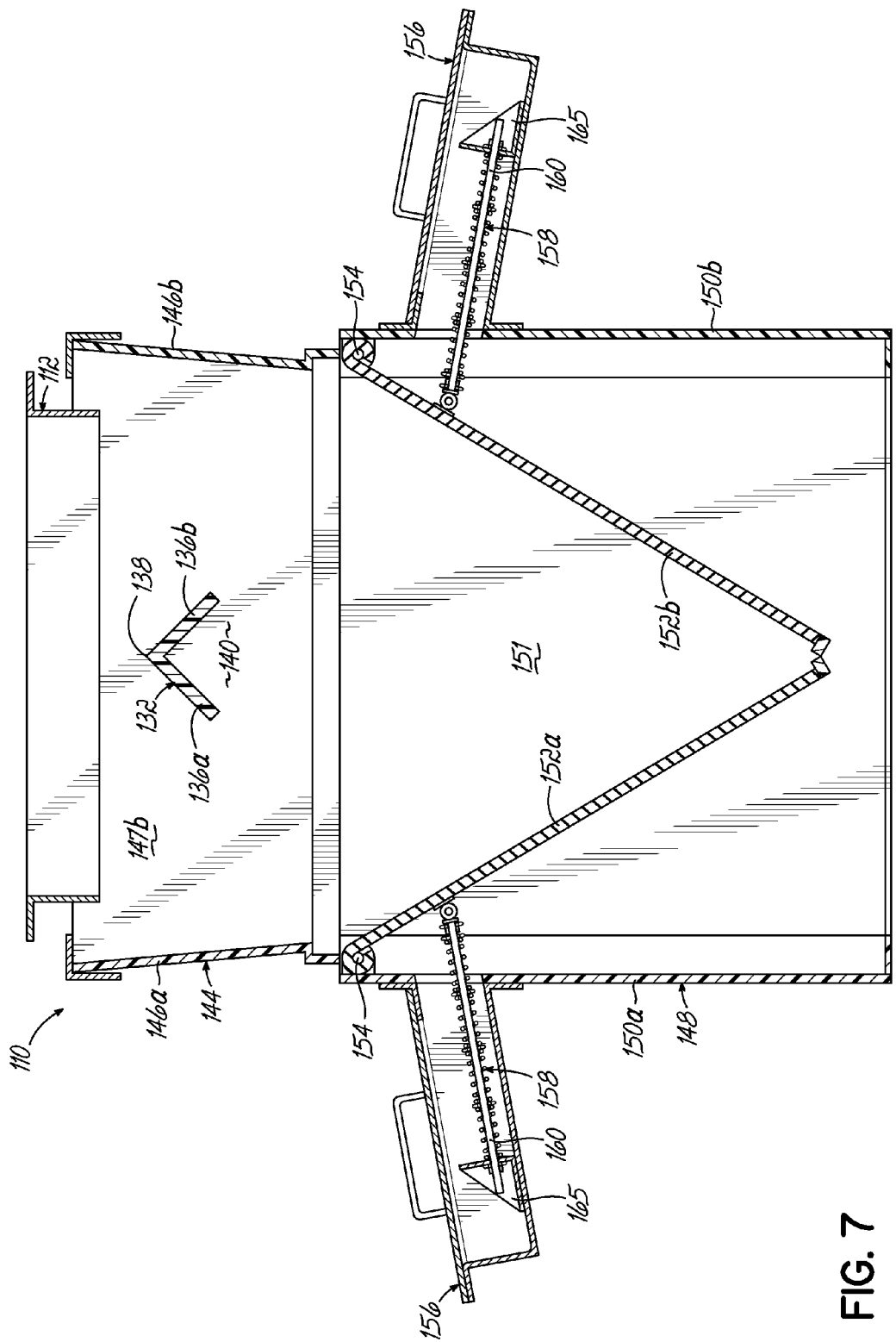
FIG. 7 is a cross-sectional view taken along line 7-7 of the embodiment of FIG. 5.

Referring to FIGS. 5-7, a second embodiment of a dustless spout assembly 110 according to this invention is shown. The assembly 110 includes an upper chute section 112. In operation, the spout assembly 110 is particularly adapted for the transfer of soybeans or other particulate material in a generally vertical downward direction from a supply of soybeans into a rail car, cargo hold or other receptacle at the downstream exit end of the assembly 110.

A funnel 144 is located downstream from the chute section 112 and includes a pair of opposed tapered sidewalls 146a, 146b and a pair of opposed sidewalls 147a, 147b to form a rectangular funnel 144. The tapered sidewalls 146a, 146b are generally parallel with the orientation of legs 136a, 136b of a divider 132 mounted in the funnel 144 and in the flow path of the material. At the downstream end, narrow portion of the funnel 144, a spout 148 is mounted to the assembly 110. The spout 148 has a pair of spaced, generally parallel outer walls 150a, 15a, each of which extends downwardly from one of the sidewalls 146a, 146b of the funnel 144. A back wall 151 is mounted between the outer walls 150a, 150b. A door 153 is opposite the back wall 151 and is pivotally mounted to an edge of the wall 150b by one or more hinges 155. The door 153 may be secured closed by one or more latch assemblies 157. A port or window 159 may be included in the door 153.

As shown particularly in FIG. 7, the divider 132 is positioned centrally within the funnel 144 to extend longitudinally between opposite sections of the funnel 144. The divider 132 is fixedly mounted within the funnel 144 within the travel path of the soybeans flowing from the chute section 112, so as to divide the flow of soybeans into first and second split streams on opposite sides of the divider 132. In one embodiment, the divider 132 may have a pair of generally perpendicularly oriented legs 136a, 136b with the juncture 138 between the legs oriented medially within the funnel 144 and directed upwardly to thereby divide the flow of soybeans into the split streams.

One advantage to the divider 132 according to various embodiments of this invention is that a region 140 immediately below the divider 32 and generally between the spaced split streams of material is a void region with little or no material within the void region 140. Due to the flow characteristics of the particulate material and the divider 132 splitting the flow of material into the split streams, a significant portion of the dust generated from the flow of the material is entrapped within the void region 140 immediately below the divider 132. As such, the generation of the dust, which would normally result from the flow of material, is minimized and reduced as it is trapped and concentrated within the void region 140 below the divider 132.

A pair of opposed and moveable plates 152a, 152b is mounted within the assembly 110 to deflect and guide the soybeans flowing from the funnel 144 into the spout 148 as shown generally in FIGS. 5-7. Each plate 152 is a planar member which is mounted by a hinge 154 along its upper edge at the juncture between the spout 148 and the funnel 144.

After the split streams flow past the divider 132 and downstream from the void region 140, they merge back together in the funnel 144 mounted beneath the chute section 112. A counterbalance mechanism 156, in the form of one or more compression spring and rod assemblies 158, is mounted adjacent the lower end of each plate 152. In one embodiment as shown in FIGS. 5-7, the counterbalance mechanism 156 includes one or more rod and compression spring assemblies 158 with a rod 160 pivotally attached to an outer surface of the plate 152 and extending laterally outwardly within a housing 163 adjacent to the outer wall 150 of the spout 148. A compression spring 166 is mounted between an abutment in the form of a brace plate 165 and a nut 168 threaded on the rod 160 and the inner face of the outer wall 150 of the spout 148. The compression spring 166 biases the plate 152 toward the center line of the assembly 110 and the opposite plate and into the path of the soybeans flowing downwardly through the funnel 144 and into and through the spout 148.

Each spring and rod assembly 158 is mounted within the housing 163 and between one of the plates 152 and a brace plate 165. A series of nuts 167 are each threaded onto one of the rods 160 and washers 169 may be spaced on the rod 160 and associated spring 166. The biasing force delivered to the plate 152 may be adjusted in a number of ways. The position of the nut 168 adjacent the plate 165 on the rod 160 may be adjusted to compress or decompress the associated spring 166. Similarly, the nut 167 on the opposite end of the rod 160 may be adjusted also. Additionally, the position of the brace plate 165 within the housing 163 may be adjusted via mounting bolts 171 securing the brace plate 165 along a slot 173 in the housing 163. Moreover, springs 166 of different strength and/or spring constants can be used to vary the biasing force on the plates 152. The biasing force on one plate 152a may be adjusted to be different from or the same as the biasing force on the other plate 152b, as needed.

In one embodiment, the counterbalance mechanism 156 includes the pair of opposed plates 152a, 152b with five threaded rod and spring assemblies 158 coupled to each plate 152. One of ordinary skill in the art would appreciate that the biasing force delivered onto each plate 152 may be adjusted depending upon the strength or spring constant of the spring 166, and the number of springs 166 engaging the plate 152, in one embodiment of this invention. As a result, the spout assembly 110 of this invention avoids the clogging of excessive accumulation of material even during surges while minimizing the discharge of dust and fines into the work environment.

As the soybeans flow through the chute section 112 and around the divider 132 in the funnel 144 as the split streams are merged together. As the material exits the funnel 144, it enters the spout 148 and engages the plates 152a, 152b. As the weight of the material impinges upon the plates 152, the plates 152 are urged outwardly against the bias of the counterbalance mechanism 156 to increase the open area for the material to flow through the spout 148. As the flow of material decreases, the weight of the material on the plates 152 likewise decreases and the bias of the counterbalance mechanism springs 166 urges the plates 152 inwardly, thereby directing and focusing the flow of the material through the assembly 110. Advantageously, the void region 140 entraps the dust and collects it and circulates it back into the split streams of material thereby minimizing the escape of the dust during the transfer process of the material through the assembly 110.

Figure 8:
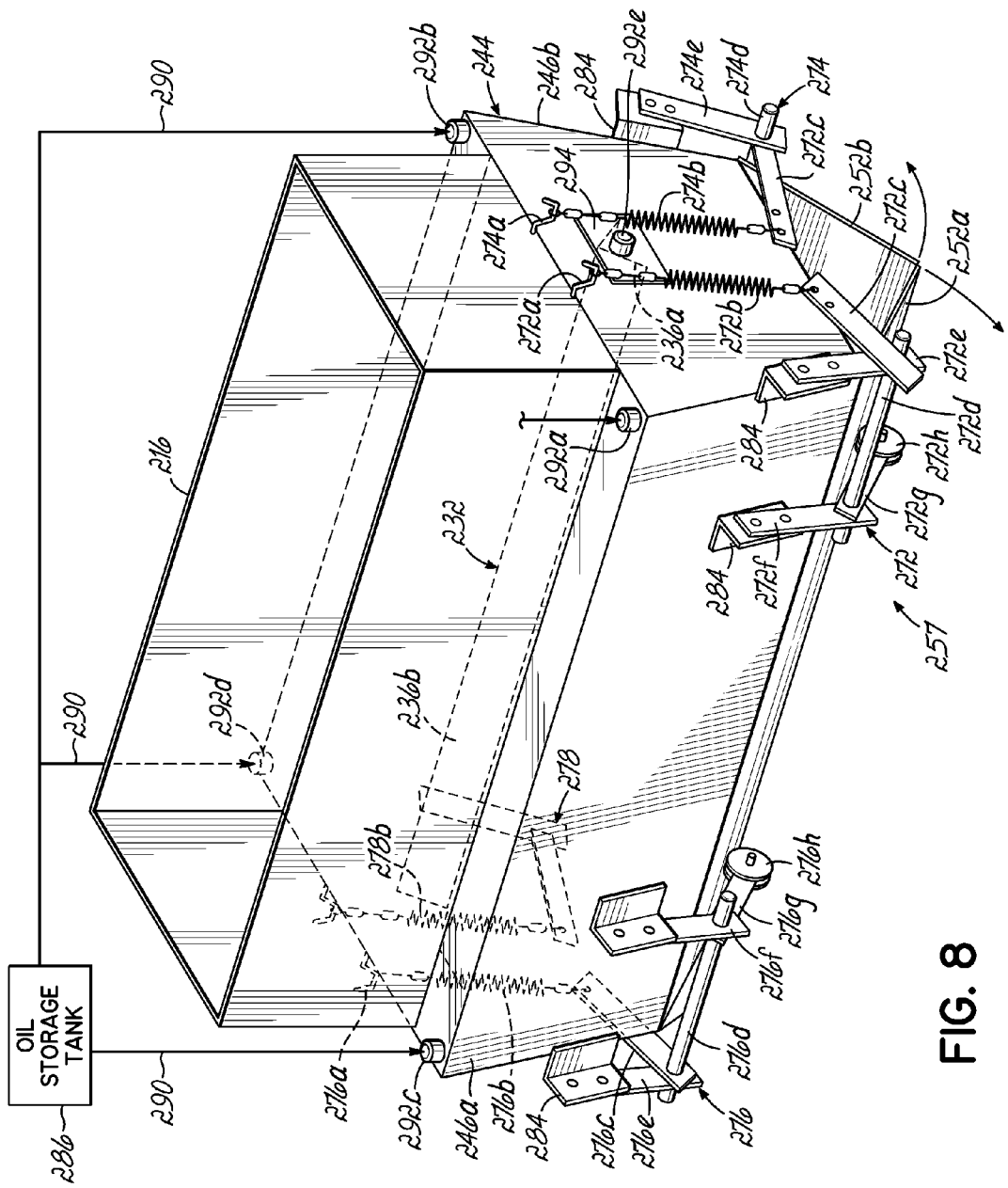
FIG. 8 is a perspective view of another exemplary embodiment of the spout assembly with the counterbalance mechanism including first, second, third, and fourth extension springs.
Figure 9:
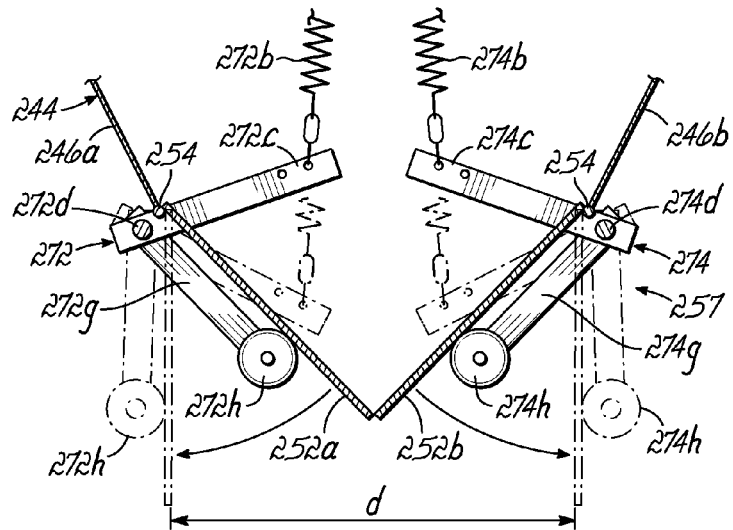
FIG. 9 is a end schematic view of FIG. 8, with the counterbalance mechanism including first and second extension springs.
Figure 12:
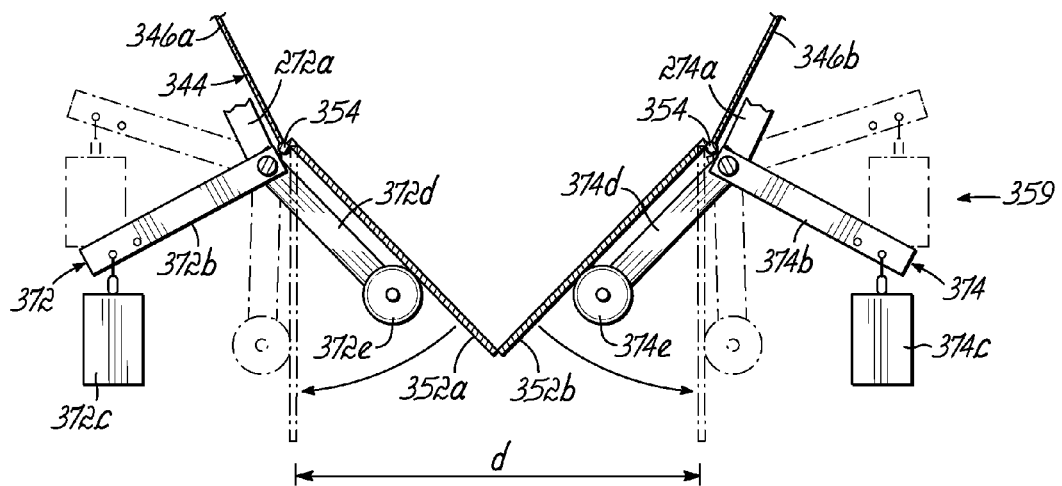
FIG. 12 is a end schematic view of FIG. 11, with the counterbalance mechanism including first and second counterweights.
Figure 10:
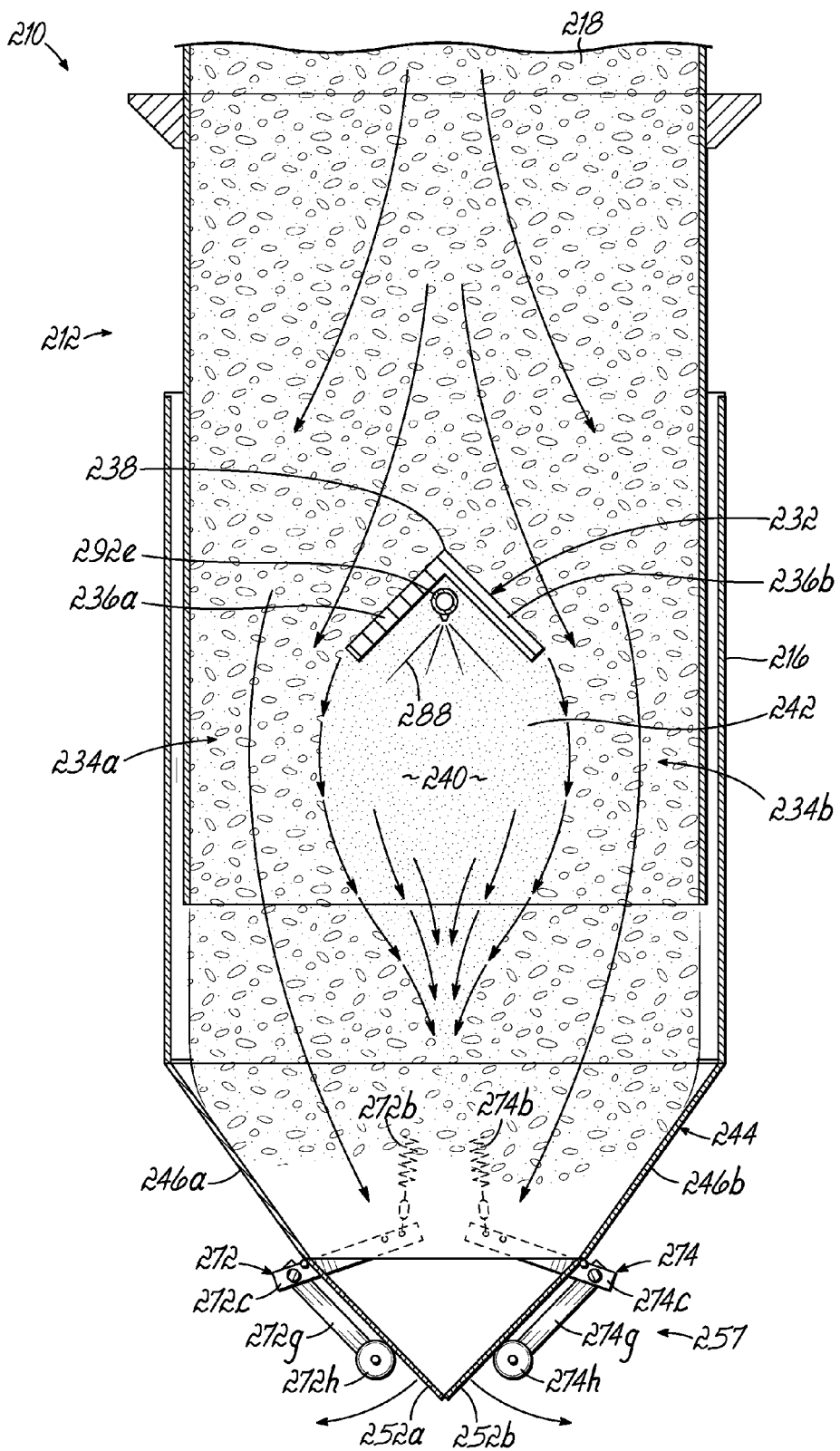
FIG. 10 is a cross-sectional view of the spout assembly of FIG. 8 with particulate material flowing through it.

Now referring to FIGS. 8-10, another exemplary embodiment of a spout assembly 210 of the present invention is shown in detail. This spout assembly 210 includes many of the same elements as the previously described embodiments (spout assemblies 10, 110), and these elements have been provided with similar reference numbers in the 200 series where the elements are substantially similar or identical. For example, this embodiment includes a chute section 212, a lower chute 216, particulate material 218, a divider 232, a first split stream 234a, a second split stream 234b, a pair of generally perpendicularly oriented legs 236a, 236b, a juncture 238, a void region 240, dust 242, a funnel 244, opposed tapered sidewalls 246a, 246b, a first moveable plate 252a, and a second moveable plate 252b.

The spout assembly 210 is configured to regulate the flow of particulate material 218, such as grain, soybeans, and other suitable particulate materials. The divider 232 may be positioned upstream from the first and second plates 252a, 252b to divide the flowing stream of particulate material 218 into a first and second split streams 234a, 234b and a void region 240 for entrapping the dust 242 (adjacent to the first and second split streams 234a, 234b). After passing through the divider 232, the first and second split streams 234a, 234b and the void region 240 merge together prior to engaging the first and second plates 252a, 252b. The spout assembly 210 allows for continuously discharging particulate material 218 through the opening while varying the size of the opening adjacent the first and second plates 252a, 252b as the weight of the mass of particulate material 218 above the opening changes with flow rate variations of the particulate material 218. For example, the size of the opening increases as the weight of the particulate material 218 increases in response to an increase in the flow rate of the particulate material 218.

As shown, the first and second moveable plates 252a, 252b are positioned downstream from the chute section 212. Each of the first and second moveable plates 252a, 252b is hingably connected to the chute section 212 using hinges 254. The first and second moveable plates 252a, 252b also deflect the particulate material 218 toward a longitudinal axis of the chute section 212. As shown, each of the first and second moveable plates 252a, 252b project toward a centerline axis of the chute section 212, with lower ends of the first and second moveable plates 252a, 252b defining an opening in the path of the stream with an area that is smaller than a cross-sectional area of the chute section 212, so that the particulate material 218 may accumulate prior to passing through the opening. As shown in FIG. 9, the central opening may be opened distance "d", which according to one exemplary embodiment may be about 14 inches. Additionally, the first and second moveable plates 252a, 252b, and/or the funnel 244 may have a length along the longitudinal axis of about 30 inches; however this dimension may vary, depending on the desired throughput of particulate material 218.

The counterbalance mechanism 257 may include one or more separately adjustable counterbalances that produce a biasing force on one of the first and second moveable plates 252a, 252b to adjust the area of the opening. This biasing force restricts the fall of the particulate material 218, thereby slowing its movement through the central opening located adjacent the lower ends. The first and second plates 252a, 252b are yieldably biased inwardly toward the centerline that reduces the size of the opening with a biasing force delivered by a counterbalance mechanism 257. The counterbalance mechanism 257 also permits the first and second moveable plates 252a, 252b to move outwardly away from the centerline in response to the increased weight of the accumulated particulate material 218.

With continued reference to FIG. 8, the counterbalance mechanism 257 may include a first separately adjustable counterbalance 272, a second separately adjustable counterbalance 274, a third separately adjustable counterbalance 276, and a fourth separately adjustable counterbalance 278. The first and third separately adjustable counterbalances 272, 276 affect the movement of the first moveable plate 252a, while the second and fourth separately adjustable counterbalance 274, 278 affect the movement of the second plate 252b. This allows the biasing force delivered to the individual plates (such as the first moveable plate 252a) to be adjusted without adjusting the biasing force delivered to a remainder of the plates (such as the second moveable plate 252b), or to other portions of the same plate. Persons skilled in the art would appreciate that the counterbalance mechanism 257 may include more or less separately adjustable counterbalances.

As shown, each of the first, second, third, and fourth separately adjustable counterbalance mechanisms 272, 274, 276, 278 is independent, meaning that the biasing force caused by each may be altered without altering the other of the other separately adjustable counterbalances. While the first, second, third, and fourth separately adjustable counterbalances 272, 274, 276, 278 are shown as being attached to the funnel 244, persons skilled in the art would appreciate that the first, second, third, and fourth separately adjustable counterbalances 272, 274, 276, 278 may instead, or in addition to, be attached to any portion of the spout assembly 210, such as the chute section 212.

The operation of the first, second, third, and fourth separately adjustable counterbalances 272, 274, 276, 278 will now be discussed in greater detail. As shown, the first separately adjustable counterbalance 272 includes a connecting element 272a, a first extension spring 272b, a first connecting arm 272c, a first connecting rod 272d, first and second attachment arms 272e, 272f, a second connecting arm 272g, and a first roller 272h. The connecting element 272a is coupled to the funnel 244, and the first extension spring 272b is coupled at one end to the connecting element 272a and at the other end to the first connecting arm 272c. The first connecting arm 272c is attached to the first connecting rod 272d that, as shown, extends parallel to the longitudinal axis of the funnel 244 and is attached to first and second attachment arms 272e, 272f. The first connecting rod 272d is attached to the second connecting arm 272g which contains the first roller 272h at its opposite end. As a result, the first separately adjustable counterbalance 272 allows the first roller 272h to move freely on the surface of the first moveable plate 252a based on the biasing force delivered to the first moveable plate 252a. As shown in FIG. 8, the connecting element 272a may attach to different locations of the first extension spring 272b, while the first connecting arm 272c may attach to different locations of the first extension spring 272b for added flexibility. Similarly, the connecting element 274a may attach to different locations of the second extension spring 274b, while the first connecting arm 274c may attach to different locations of the second extension spring 274b for added flexibility.

With continued reference to FIG. 8, the second separately adjustable counterbalance 274 includes a connecting element 274a, a second extension spring 274b, a first connecting arm 274c, a first connecting rod 274d, first and second attachment arms 274e, 274f, a second connecting arm 274g, and a second roller 274h. The connecting element 274a is coupled to the funnel 244, while the second extension spring 274b is coupled at one end to the connecting element 274a and at the other end to the first connecting arm 274c. The first connecting arm 274c is attached to a first connecting rod 274d that runs parallel to the longitudinal axis of the funnel 244 and is attached to the first attachment arm 274e and a second attachment arm (not shown). The first connecting rod 274d is attached to a second connecting arm 274g containing the second roller 274h at its other end. As a result, the second separately adjustable counterbalance 272 allows the second roller 274h to move freely on the surface of the second moveable plate 252b based on the biasing force delivered to the the second moveable plate 252b. While not shown in detail, the fourth separately adjustable counterbalance 278 allows a fourth roller (not shown) to move freely relative to the second moveable plate 252b based on the biasing force delivered to the second moveable plate 252b. The fourth separately adjustable counterbalance 278 includes the same features of the second separately adjustable counterbalance 274, with the connecting element 278a and a second extension spring 278b being shown.

As shown, the third separately adjustable counterbalance 276 includes a connecting element 276a, a second extension spring 276b, a first connecting arm 276c, a first connecting rod 274d, first and second attachment arms 276e, 276f, a second connecting arm 276g, and a third roller 276h. The connecting element 276a is coupled to the funnel 244, while the third extension spring 276b is coupled at one end to the connecting element 276a and at the other end to the first connecting arm 276c. The first connecting arm 276c is attached to a first connecting rod 276d that extends parallel to the longitudinal axis of the funnel 244 and is attached to the first and second attachment arms 276e, 276f. The first connecting rod 276d is attached to a second connecting arm 276g containing the third roller 276h. As a result, the third separately adjustable counterbalance 276 allows the third roller 276h to move freely on the surface of the first moveable plate 252a based on the biasing force delivered to the first moveable plate 252a.

Persons skilled in the art would appreciate that the biasing force delivered to the first and second plates 252a, 252b may be adjusted depending upon the strength or spring constant of the first, second, third, and/or fourth extendible springs 272b, 274b, 276b, 278b and the number of extendible springs engaging the first and second plates 252a, 252b. The extendible springs enable the choke feed, resulting in the particulate material 218 to back up and squeeze the air out of the stream of particulate material 218. Pressure on the extendible spring or a combination of extendible springs creates the choke feed. As previously mentioned, the biasing force on the first plate 252a may be adjusted to be different from or the same as the biasing force on the second plate 252b, and vice-a-versa as needed. An operator may use a sight glass (not shown) located upstream of the divider 232 to view the amount of particulate material 218 accumulated in the spout assembly 210.

As shown in FIG. 8, the location of the first, second, third, and fourth separately adjustable counterbalances 272, 274, 276, 278 prevent an operator from being forced to adjust the biasing force from a difficult or uncomfortable position, such as lying underneath the spout assembly 210. Additionally, persons skilled in the art would appreciate that any number of rollers may be used for any of the first, second, third, and fourth separately adjustable counterbalances 272, 274, 276, and 278.

Figure 11:
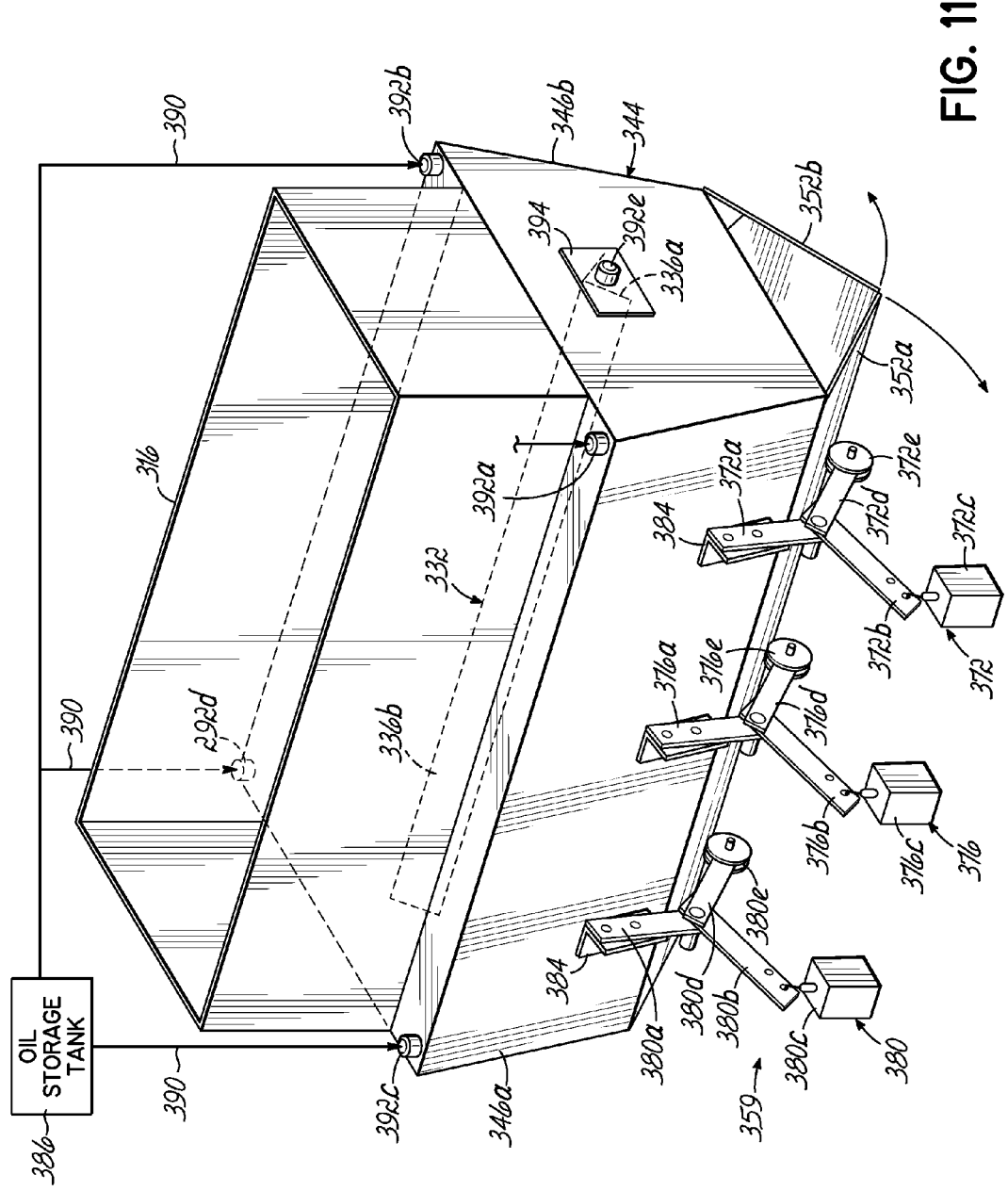
FIG. 11 is a perspective view of another exemplary embodiment of the spout assembly with the counterbalance mechanism including a plurality of removable counterweights.
Figure 13:
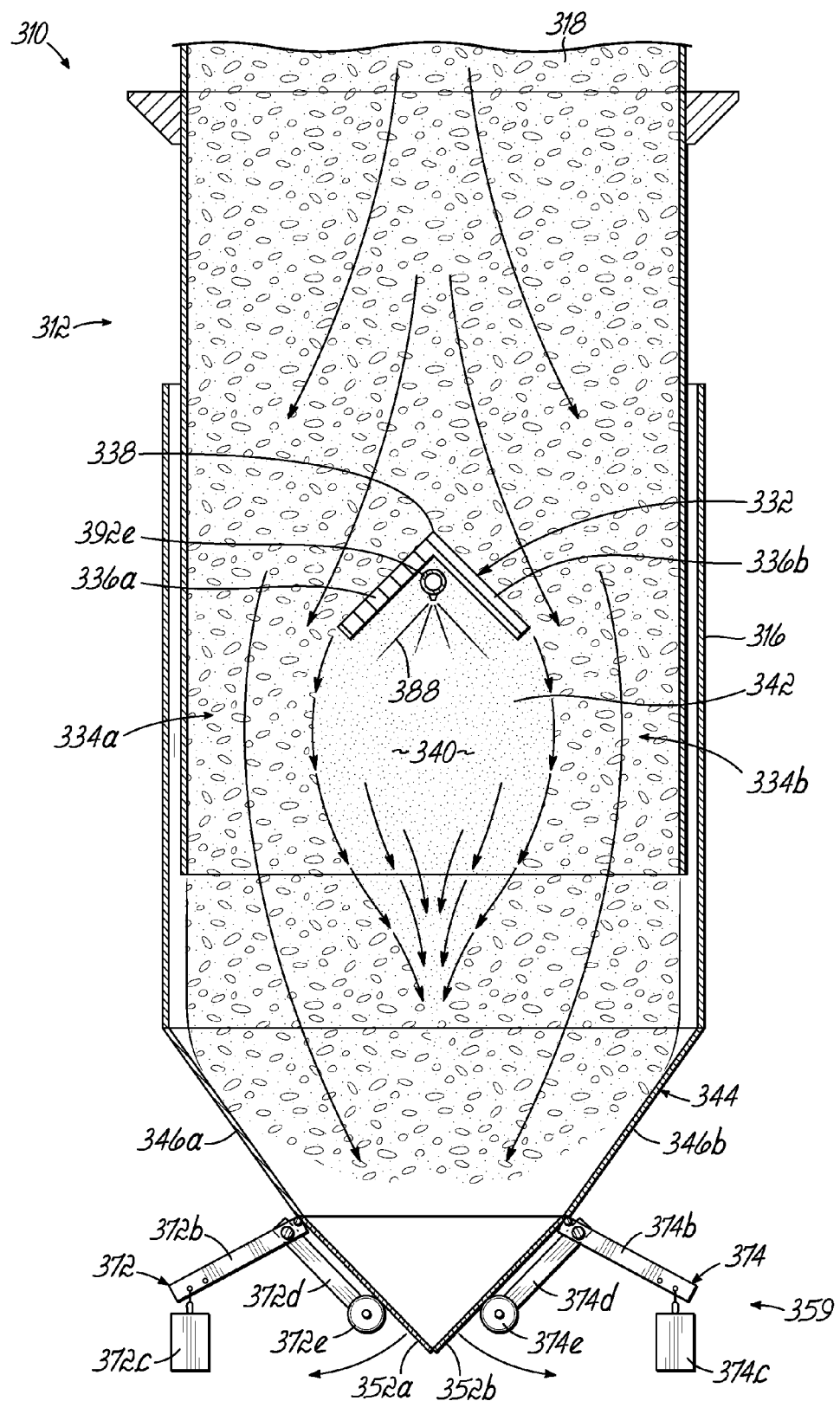
FIG. 13 is a cross-sectional view of the spout assembly of FIG. 11 with particulate material flowing through it.

Now referring to FIG. 11, another exemplary embodiment of a spout assembly 310 is shown in detail. This spout assembly 310 includes many of the same elements as the previously described embodiments (spout assemblies 10, 110, 210), and these elements have been provided with similar reference numbers in the 300 series where the elements are substantially similar or identical. For example, this embodiment again includes a chute section 312, a lower chute 316, particulate material 318, a divider 332, a first split stream 334a, a second split stream 334b, a pair of generally perpendicularly oriented legs 336a, 336b, a juncture 338, a void region 340, dust 342, a funnel 344, opposed tapered sidewalls 346a, 346b, a first moveable plate 352a, and a second moveable plate 352b.

The divider 332, such as a non-rotatable divider, may be positioned upstream from the first and second plates 352a, 352b to divide the flowing stream of particulate material 318 into a first and second split streams 334a, 334b and a void region 340 for entrapping the dust 342 adjacent to the first and second split streams 334a, 334b. After passing through the divider 332, the first and second split streams 334a, 334b and the void region 340 merge together prior to engaging the first and second plates 352a, 352b.

With continued reference to FIG. 11, the counterbalance mechanism 359 includes a first separately adjustable counterbalance 372, a second separately adjustable counterbalance 374, a third separately adjustable counterbalance 376, a fourth separately adjustable counterbalance (not shown), a fifth separately adjustable counterbalance (not shown), and a sixth separately adjustable counterbalance (not shown). As shown, the first, third, and fifth separately adjustable counterbalances 372, 376, 380 adjust the position of the first moveable plate 352a, while the second separately adjustable counterbalance 274, and the fourth and sixth separately adjustable counterbalances act in the much the same manner as the first, third, and fifth separately adjustable counterbalances 372, 376, 380, but instead, adjust the position of the second moveable plate 352b. Persons skilled in the art would appreciate that the counterbalance mechanism 359 may include more or less separately adjustable counterbalances, for example only first and second separately adjustable counterbalances 372, 374.

The operation of the separately adjustable counterbalances will now be discussed in greater detail. The first separately adjustable counterbalance 372 includes an attachment member 372a coupled to a bracket 384, a counterweight containing member 372b that supports a first removable counterweight 372c, and a connecting member 372d that is attached at a first end to a first roller 372e and at a second end to the attachment member 372a. Adjusting the weight of the first removable counterweight 372c affects the biasing force delivered to the first moveable plate 352a. As a result, the first separately adjustable counterbalance 372 allows the first roller 372e to move freely relative to the first moveable plate 352a.

The second separately adjustable counterbalance 374 includes an attachment member (not shown) coupled to another bracket (not shown), a counterweight containing member 374b that supports a second removable counterweight 374c, and a connecting member 374d that is attached at a first end to a second roller 374e and at a second end to the attachment member 374a. Adjusting the weight of the second removable counterweight 374c affects the biasing force delivered to the second moveable plate 352b. As a result, the second separately adjustable counterbalance 374 allows the second roller 374e to move freely relative to the second moveable plate 352b. Again, while not shown in detail, the fourth and sixth separately adjustable counterbalances act in a similar manner to the second separately adjustable counterbalance 374 and include similar components.

The third separately adjustable counterbalance 376 includes an attachment member 376a coupled to a bracket 384, a counterweight containing member 376b that supports a third removable counterweight 376c, and a connecting member 376d that is attached at a first end to a third roller 376e and at a second end to the attachment member 376a. Adjusting the weight of the third removable counterweight 376c affects the biasing force delivered to the first moveable plate 352a. As a result, the third separately adjustable counterbalance 376 allows the third roller 376e to move freely relative to the first moveable plate 352a.

The fifth separately adjustable counterbalance 380 includes an attachment member 380a coupled to a bracket 384, a counterweight containing member 380b that supports a fifth removable counterweight 380c, and a connecting member 380d that is attached at a first end to a fifth roller 380e and at a second end to the attachment member 380a. Adjusting the weight of the fifth removable counterweight 380c affects the biasing force delivered to the first moveable plate 352a. As a result, the fifth separately adjustable counterbalance 380 allows the fifth roller 380e to move freely relative to the first moveable plate 352a.

As shown in FIG. 11, the location of the first, second, third, fourth, fifth, and sixth separately adjustable counterbalances prevent an operator from adjusting the biasing force in a difficult or uncomfortable position, such as lying underneath the spout assembly 310. By adding and removing weight from the separately adjustable counterbalances, the flow of the particulate material 318 through the first and second moveable plates 352, 352b can be accurately controlled and fine tuned, as needed. By accurately controlling the flow of the particulate material 318 through the first and second moveable plates 352, 352b, a desirable choke feed may be maintained that causes the particulate material 318 to back up and squeeze the air out of the stream of particulate material 318.

As shown in FIGS. 8 and 11, the spout assembly 210, 310 may include an oil storage tank 286, 386 containing a suitable oil 288, 388 (such as mineral oil), a plurality of oil conduits 290, 390 fluidly coupled to the oil storage tank 286, 386 and to the chute section 212, 312, and a corresponding plurality of spray nozzles 292, 392. The plurality of spray nozzles 292, 392 are coupled to the chute section 212, 312 and configured to spray the oil 288 onto the particulate material 218, 318 to reduce dust 242, 342. As shown in FIG. 8, the plurality of oil conduits 290 include first, second, third, fourth, and fifth conduits 290, while the plurality of spray nozzles 292 include first, second, third, fourth, and fifth spray nozzles 292a-e. Similarly, as shown in FIG. 11, the plurality of oil conduits 390 include first, second, third, fourth, and fifth conduits 390, while the plurality of spray nozzles 392 include first, second, third, fourth, and fifth spray nozzles 392a-e spraying oil from the oil storage tank, supply or reservoir of oil 286, 386. The plurality of spray nozzles 292, 392 are removable for cleaning and for other purposes.

With continued reference to FIGS. 8 and 11, the oil 288, 388 is sprayed to reduce the dust 242, 342 after the particulate material 218, 318 enters the chute section 212, 312 and prior to the particulate material 218, 318 being discharged through the opening. The oil 288, 388 binds the dust 242, 342 to the particulate material 218, 318. The divider 232, 332 controls most of the dust 242, 342, and the insertion of oil 288, 388 at specific locations supplements the dust control provided by the divider 232, 332. Inserting at the end of the process rather than the beginning uses a lot less oil 288, 388. Persons skilled in the art would appreciate a wide variety of spray nozzles may be used. The amount of oil 288, 388 applied depends on the condition of the particulate material 218, 318. For example, loading the particulate material 218, 318 located in the bottom of the storage silo and/or loading particulate material 218, 318 that was combined when the field was dry, each generally result in a dryer particulate material 218, 318 that creates more dust 242, 342.

With continued reference to FIGS. 8 and 11, the fifth spray nozzle 292e, 392e is located downstream of the divider 232, 332 and upstream from the first moveable plate 252a, 352a and the second moveable plate 252b, 352b. The fifth spray nozzle 292e, 392e is configured to spray the oil 288, 388 into the void region 240, 340 for entrapping dust adjacent to split streams created by the divider 332. Additionally, the fifth spray nozzle 292e, 392e may include multiple individual spray nozzles to minimize the dust 242, 342 in the void region 240, 340. For example, the fifth spray nozzle 292e, 392e may include first, second, and third divider spray nozzles that are coupled to a removable insert 294, 394 that allow the spray nozzles to be cleaned and/or replaced as needed. While the removable insert 294, 394 may extend the entire width of the funnel 244, 344, persons skilled in the art would appreciate the removable insert 294, 394 may include multiple removable portions, allowing a portion of the removable insert 294, 394 to be removed from each side.

The invention is described herein for use in controlling the flow of grain, soybeans or other particulate material, and it is readily useful for other materials. The particulate material streams or flows through the assembly and drops directly into the chamber of the cargo carrier below. The cross-sectional area of the opening in the spout may be smaller than the cross-sectional area of the channel section so that a mass of particulate material tends to accumulate at the funnel and above the opening in the spout. The accumulated particulate material mass reduces the velocity of the particulate material without clogging the stream of material.

The quantity of particulate material, the variable diameter of the flow stream, the variable speed of the flow or height of drop of the material in addition to the kind of grain or particulate material, and the associated weight thereof are factors which may be considered when adjusting the counterbalance mechanism. The counterbalance mechanism provides for a variable biasing force or a resistance upon a downward flow of the particulate material so that the variable input forces available from respective parameters of the particulate material are offset by the variable biasing or reaction forces delivered by the counterbalancing mechanism to the plates. This invention provides a highly sensitive counterbalancing mechanism for acute and precise adjustment based on the proper particulate material flow parameters and operation depending upon the particular type of grain or material. Moreover, one or more features of the assembly, including, but not limited to, the divider, funnel, spout, counterbalance mechanism and plates, contribute to the reduction of dispersed dust and controlled flow of the material.

According to another embodiment, a method of retrofitting a conduit through which particulate material flows in a generally downward direction is described. The conduit includes a regulator for controlling the flow of the material therethrough, the regulator includes a plurality of downwardly and inwardly sloping plates having lower ends in the path of the flowing material in the conduit, and the plates slowing the movement of the material and deflecting the material toward a longitudinal axis of the conduit. The method includes coupling a counterbalance mechanism to the plates to deliver a biasing force on the plates inwardly in a direction tending to reduce a size of an opening defined by lower ends of the plates through which the material flows. The method also includes restricting the fall of the material and slowing movement through the opening with the plates. The method also includes dividing the flowing stream into a plurality of split streams. The method also includes adjusting the biasing force delivered by the counterbalance mechanism on the plates. The dividing step may be performed prior to the restricting step.

The method may also include delivering the biasing force to the plates through a spring mounted relative to a portion of the counterbalance mechanism for contact with the respective plate. The method may also include adjusting the biasing force delivered to selected ones of the plates without adjusting the biasing force delivered to a remainder of the plates. The biasing force may be adjusted as a function of a spring constant of the spring.

From the above disclosure of the general principles of this invention and the preceding detailed description of at least one embodiment, those skilled in the art will readily comprehend the various modifications to which this invention is susceptible. Therefore, I desire to be limited only by the scope of the following claims and equivalents thereof.

We claim:

1. A method of regulating the flow of particulate material which is falling in a chute section, the method comprising:
   interposing first and second plates each having a lower end in the path of the stream in the chute section, the first and second plates slowing the movement of the particulate material and deflecting the particulate material toward a longitudinal axis of the chute section;
   providing a central opening adjacent the lower end of each of the first and second plates;
   yieldably biasing the first and second plates inwardly in a direction tending to reduce the size of the opening with a biasing force delivered by a counterbalance mechanism, the first and second plates restricting the fall of the material and slowing movement through the central opening;
   adjusting the biasing force delivered to the first plate using at least a first separately adjustable counterbalance;
   adjusting the biasing force delivered to the second plate using at least a second separately adjustable counterbalance; and
   continuously discharging the particulate material through the central opening while varying the size of the opening adjacent the plates as the weight of the mass of particulate material above the central opening changes with flow rate variations of the material, the size of the central opening increasing as the weight of the mass increases in response to an increase in the flow rate of the material,
   wherein the biasing force delivered to the first plate is adjusted without adjusting the biasing force delivered to the second plate.

2. The method of claim 1:
   wherein adjusting the biasing force delivered to the first plate further comprises adjusting a first extension spring affecting the biasing force delivered to the first plate, and
   wherein adjusting the biasing force delivered to the second plate further comprises adjusting a second extension spring affecting the biasing force delivered to the second plate.

3. The method of claim 1:
   wherein adjusting the biasing force delivered to the first plate further comprises adjusting the weight of the first removable counterweight affecting the biasing force delivered to the first plate, and
   wherein adjusting the biasing force delivered to the second plate further comprises adjusting the weight of the second removable counterweight affecting the biasing force delivered to the second plate.

4. The method of claim 1 further comprising:
   spraying an oil to reduce dust after the particulate material enters the chute section and prior to the particulate material being discharged through the opening.

5. The method of claim 1 further comprising:
   dividing the flowing stream into a plurality of split streams and a region for entrapping dust adjacent to the split streams using a non-rotatable divider positioned upstream from the first and second plates; and
   allowing the split streams and the region to merge together prior to engaging the first and second plates.

6. A method of regulating the flow of particulate material which is falling in a chute section, the method comprising:
   interposing at least first and second plates each having a lower end in the path of the stream in the chute section, the first and second plates slowing the movement of the particulate material and deflecting the particulate material toward a longitudinal axis of the chute section;
   providing a central opening adjacent the lower end of each of the first and second plates;
   yieldably biasing the first and second plates inwardly in a direction tending to reduce the size of the opening with a biasing force delivered by a counterbalance mechanism, the first and second plates restricting the fall of the material and slowing movement through the central opening;
   adjusting the biasing force delivered to the first plate using at least a first and a third separately adjustable counterbalances affecting the biasing force delivered to the first plate; and
   adjusting the biasing force delivered to the second plate using at least a first and a fourth separately adjustable counterbalances affecting the biasing force delivered to the second plate; and
   continuously discharging the particulate material through the central opening while varying the size of the opening adjacent the plates as the weight of the mass of particulate material above the central opening changes with flow rate variations of the material, the size of the central opening increasing as the weight of the mass increases in response to an increase in the flow rate of the material.

7. The method of claim 6:
wherein adjusting the biasing force delivered to a first plate further comprises adjusting a third extension spring affecting the biasing force delivered to the first plate, and
wherein adjusting the biasing force delivered to a second plate further comprises adjusting a fourth extension spring affecting the biasing force delivered to the second plate.

8. The method of claim 6:
wherein adjusting the biasing force delivered to the first plate further comprises adjusting the weight of the third removable counterweight affecting the biasing force delivered to the first plate, and
wherein adjusting the biasing force delivered to a second plate further comprises adjusting the weight of the fourth removable counterweight affecting the biasing force delivered to the second plate.

9. An apparatus for regulating the flow of particulate material comprising:
a chute section adapted to receive the flow of particulate material;
at least first and second plates positioned downstream from the chute section, each of the first and second plates having a lower end and being coupled to the chute section, each of the first and second plates projecting toward a centerline axis of the chute section, the lower ends of the first and second plates defining an opening with an area that is smaller than a cross-sectional area of the chute section so that the material may accumulate prior to passing through the opening; and
a counterbalance mechanism that produces a biasing force on the first and second plates toward the centerline to adjust the area of the opening, the counterbalance mechanism permitting the first and second plates to move outwardly away from the centerline in response to the weight of the accumulated material, wherein the counterbalance mechanism further comprises:
a first and a third separately adjustable counterbalances coupled to the first plate; and
a second and a fourth separately adjustable counterbalances coupled to the second plate.

10. The apparatus of claim 9:
wherein the first separately adjustable counterbalance further comprises at least a first roller that moves relative to the first plate based on the biasing force delivered to the first plate, and
wherein the second separately adjustable counterbalance further comprises at least a second roller that moves relative to the first plate based on the biasing force delivered to the second plate.

11. The apparatus of claim 10:
wherein the third separately adjustable counterbalance further comprises at least a third roller that moves relative to the first plate based on the biasing force delivered to the first plate, and
wherein the fourth separately adjustable counterbalance further comprises at least a fourth roller that moves relative to the first plate based on the biasing force delivered to the second plate.

12. The apparatus of claim 11:
wherein third separately adjustable counterbalance further comprises at least a third arm coupled to a third extension spring, the third extension spring affecting the biasing force delivered to the first plate, and
wherein the second separately adjustable counterbalance further comprises at least a third arm coupled to a third extension spring, the fourth extension spring affecting the biasing force delivered to the second plate.

13. The apparatus of claim 11:
wherein the third separately adjustable counterbalance further comprises at least a third arm coupled to a third removable counterweight, the weight of the third removable counterweight affecting the biasing force delivered to the first plate, and
wherein the fourth separately adjustable counterbalance further comprises at least a fourth arm coupled to a fourth removable counterweight, the weight of the fourth removable counterweight affecting the biasing force delivered to the second plate.

14. The apparatus of claim 9:
wherein the first separately adjustable counterbalance further comprises at least a first arm coupled to a first extension spring, the first extension spring affecting the biasing force delivered to the first plate, and
wherein the second separately adjustable counterbalance further comprises at least a second arm coupled to a second extension spring, the first extension spring affecting the biasing force delivered to the second plate.

15. The apparatus of claim 9:
wherein the first separately adjustable counterbalance further comprises at least a first arm coupled to a first removable counterweight, the weight of the first removable counterweight affecting the biasing force delivered to the first plate, and
wherein the second separately adjustable counterbalance further comprises at least a second arm coupled to a second removable counterweight, the weight of the second removable counterweight affecting the biasing force delivered to the second plate.

16. The apparatus of claim 9 further comprising:
an oil reservoir containing oil;
a plurality of oil conduits fluidly coupled to the oil reservoir and to the chute section; and
a corresponding plurality of oil spray nozzles coupled to the chute section and configured to spray the oil onto the particulate material to reduce dust.

17. The apparatus of claim 16, wherein one of the plurality of spray nozzles is located downstream of a non-rotatable divider and upstream from the first and second plates and configured to spray the oil into a region for entrapping dust adjacent to split streams created by the non-rotatable divider.

18. The apparatus of claim 9 further comprising:
a non-rotatable divider positioned upstream from the plates to divide the particulate material into a plurality of split streams and a region for entrapping dust adjacent to the split streams, the divider being positioned relative to the plates so as to allow the split streams and the region to merge together prior to engaging the plates.

* * * * *

UNITED STATES PATENT AND TRADEMARK OFFICE
CERTIFICATE OF CORRECTION

PATENT NO. : 9,694,995 B2  
APPLICATION NO. : 15/254024  
DATED : July 4, 2017  
INVENTOR(S) : Coy N. Haraway et al.

Page 1 of 1

It is certified that error appears in the above-identified patent and that said Letters Patent is hereby corrected as shown below:

In the Specification

In Column 6, Line 51, "plates sea, 52b", should read -- plates 52a, 52b --.

In Column 6, Line 62, "plates sea, 52b", should read -- plates 52a, 52b --.

In Column 6, Line 65, "plates sea, 52b", should read -- plates 52a, 52b --.

In Column 7, Line 7, "sea, 52b", should read -- 52a, 52b --.

In Column 7, Line 39, "150a, 15a", should read -- 150a, 150b --.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*